Patented May 7, 1935

2,000,222

UNITED STATES PATENT OFFICE 2,000,222

OXIDATION OF HYDROCARBON MATERIALS

Wilhelm Dietrich, Oppau, and Martin Luther, Mannheim, Germany, assignors to I. G. Farbenindustrie Aktiengesellschaft, Frankfort-on-the-Main, Germany No Drawing. Application February 20, 1932, Serial No. 594,391. In Germany February 27, 1931

6 Claims. (Cl. 260—116)

The present invention relates to the oxidation of hydrocarbon materials.

It is already known that aliphatic, i. e. open chain and cyclo-aliphatic hydrocarbons of high molecular weight, such as paraffin wax and paraffin oil, waxes such as Montan wax and like aliphatic open chain or cycloaliphatic bodies of high molecular weight or aliphatic alcohols and ketones of high molecular weight and mixtures containing the said compounds can be oxidized in the liquid phase with gases containing oxygen, such as air, oxygen, air enriched in oxygen or mixed with nitrogen oxides, in the presence of different catalysts. Hitherto, single heavy metal compounds and single salts of the alkaline earth metals or of aluminium or of magnesium or mixtures of these salts (according to British specification No. 310,069) and single metal enolates or mixtures thereof (according to the British specification No. 303,268) have been proposed for this purpose. The temperatures of the oxidation are usually between 100° and 200° C., preferably between about 130° and about 170° C.

We have now found that the oxidation of aliphatic compounds of high molecular weight in the liquid phase can be carried out particularly rapidly by employing from a few per thousand, such as 0.5 per cent, up to 3 per cent, by weight of the initial materials, of catalytic materials which comprise one or more compounds of the alkali metals, i. e. lithium, sodium, potassium, rubidium and cesium on the one hand and of aluminium on the other hand which are converted into salts of the fatty acids formed during the oxidation and/or of mixtures of salts or organic acids with the metals of the said two groups. For the sake of brevity these compounds will be defined in the following and in the claims as being capable of dissolution in the reaction mass. Suitable catalysts are, for example, carboxylic acid salts especially those of higher acids, such as oleates, naphthenates, palmitates, cinnamates, abietates or other resinates or mixtures thereof which are soluble in the materials to be oxidized and oxides and hydroxides as well as carbonates and carbides, capable of being decomposed with water, which compounds become soluble in the oxidation products formed. Compounds of the crude acid oxidation products, or of the acids contained therein with the said metals may also be employed. The compounds are preferably selected from the fatty acid salts, such as palmitates and oleates, or from oxides, hydroxides or carbonates of the said metals.

For example, mixtures of the said compounds of sodium with those of aluminium are particularly efficient. These catalysts exhibit their favorable action even after the addition of very small amounts such as up to 1 per cent by weight of the substances to be oxidized. The catalysts may be added to the substance to be oxidized before the oxidation in one batch or may be added in small portions during the course of the oxidation. The ratio of the compounds of the said two groups may be varied in wide limits but the content of the mixtures of one component should be generally not below 10 per cent. The ratio depends largely on the molecular size of the compound employed, salts of the bases with long chain fatty acids being usually employed in higher quantities than salts with the lowest members of the fatty acid series or oxides or hydroxides of the bases. Mixtures of about 40 per cent of alkali metal salt and of about 60 per cent of aluminium salt have proved particularly valuable.

Contrasted with the catalysts hitherto used, only about half the period of time is necessary in most cases in order to obtain the same degree of oxidation according to this invention. Likewise an increased yield of oxidation products which usually consist of free acids, esters, alcohols, aldehydes, ketones and the like is obtained. When the oxidation is rendered incomplete by prematurely interrupting it, for example as soon as from 40, 50 or 75 per cent of the initial materials is still unattacked by the oxidation and the unattacked initial material is separated, high quality, particularly pale products are rapidly obtained by the employment of the catalysts according to this invention.

The said catalysts may be employed generally for the oxidation of liquid and solid hydrocarbon materials of the aliphatic series, such as hard or soft paraffin wax, crude paraffin wax, ceresine, paraffin oil, heavy or middle oils, naphthene hydrocarbons, petroleum fractions, such as gas oil, and hydrocarbons obtained synthetically, such as the products obtained by the destructive hydrogenation or low temperature carbonization of coals, brown coals, tars, mineral oil fractions and the like. Mixtures of hydrocarbons with non-aromatic alcohols or ketones of high molecular weight, as are often obtained as by-products in an incomplete oxidation of hydrocarbons are also suitable.

The following examples will further illustrate the nature of this invention but the invention is not restricted to these examples. The parts are by weight.

*Example 1*

100 parts of a middle fraction boiling between 180° and 350° C. of a Pennsylvanian crude oil are treated in a cylindrical vessel, containing Raschig rings as filling bodies with air at 160° C. after an addition of 0.4 part of sodium palmitate and 0.6 part of aluminium palmitate, the speed of flow of the air being 1 cubic metre per hour per kilogram of initial material. After 8 hours a pale brownish oxidation product is obtained having a saponification value of 149.

*Example 2*

100 parts of a hydrocarbon fraction, boiling at normal pressure from 180° to 300° C. and which has been obtained by the distillation of a product of the destructive hydrogenation of a brown coal tar, are incorporated with 0.65 part of lithium oleate and 0.35 part of aluminium stearate, whereupon the whole is blown at 160° C. with air at the rate of 0.5 cubic metre per hour and per kilogram of initial material. In order to provide a fine dispersion of the air the latter is blown in through a porous plate of sintered quartz particles or of sintered nickel powder. After 2 hours a yellow product is obtained which possesses a saponification value of 140.

*Example 3*

200 parts of hard paraffin wax are mixed with 0.4 part of a potassium salt obtained by saponifying a crude product of the oxidation of paraffin wax with the aid of aqueous caustic potash solution and subsequent drying and with 0.6 part of aluminium abietate, whereupon the whole is blown with air at 150° C. in a cylindrical vessel at the rate of 0.5 cubic metre of air per hour and per kilogram of the wax, the air being blown in through sintered quartz or nickel plates as described in the foregoing example. After 1½ hours a white oxidation product is obtained in a yield of 105 per cent calculated on the initial wax, which product possesses a saponification value of 100 and contains about 100 parts of unattacked initial wax. By treating the reaction product at 60° C. with liquid sulphur dioxide in a pressure-tight vessel, separating the layers formed and evaporation of the sulphur dioxide from the lower layer about 110 parts of a high grade oxidation product are obtained which is free from paraffin and possesses a white color and a saponification value of 220. The upper layer which consists mainly of unattacked paraffin wax can be subjected to oxidation again.

*Example 4*

50 parts of the neutral oxygenated products, obtained from an oxidation product of paraffin wax by saponifying the latter with aqueous caustic soda solution and removing the soap solution, are mixed with 50 parts of hard paraffin wax, 0.4 part of potassium palmitate and 0.6 part of aluminium rosinate, whereupon the whole is blown with air at 150° C. for 2 hours at the rate of 1 cubic metre of air per hour and per kilogram of the initial material. A pale yellowish colored product is obtained which possesses a saponification value of 140.

What we claim is:

1. In the liquid-phase oxidation of aliphatic hydrocarbon material of high molecular weight by blowing the said materials with gases containing as the only oxidizing agent oxygen while heating, the step which comprises carrying out the reaction in the presence of up to 3 per cent, by weight of said hydrocarbon materials, of a catalytic material consisting essentially of at least one compound each of an alkali metal and of aluminium, the said compounds being capable of dissolution in the reaction mass and selected from the group consisting of carboxylic acid salts, oxides, hydroxides and carbonates of the said metals and carbides thereof, capable of being decomposed with water.

2. In the liquid-phase oxidation of aliphatic hydrocarbon materials of high molecular weight by blowing the said materials with gases containing as the only oxidizing agent oxygen while heating to from 100° to 200° C., the step which comprises carrying out the reaction in the presence of up to 3 per cent, by weight of said hydrocarbon materials, of a catalytic material consisting essentially of at least one compound each of an alkali metal and of aluminium, the said compounds being capable of dissolution in the reaction mass and selected from the group consisting of carboxylic acid salts, oxides, hydroxides and carbonates of the said metals and carbides thereof, capable of being decomposed with water.

3. In the liquid-phase oxidation of aliphatic hydrocarbon materials of high molecular weight by blowing the said materials with air while heating to from 100° to 200° C., the step which comprises carrying out the reaction in the presence of up to 3 per cent, by weight of said hydrocarbon materials, of a catalytic material consisting essentially of at least one compound each of an alkali metal and of aluminium, the said compounds being capable of dissolution in the reaction mass and selected from the group consisting of carboxylic acid salts, oxides, hydroxides and carbonates of the said metals and carbides thereof, capable of being decomposed with water.

4. In the liquid-phase oxidation of a middle oil fraction of a mineral oil by blowing the said fraction with air while heating to about 160° C., the step which comprises carrying out the reaction in the presence of up to 3 per cent, by weight of said hydrocarbon materials, of a catalytic material consisting essentially of at least one compound each of an alkali metal and of aluminium, the said compounds being capable of dissolution in the reaction mass and selected from the group consisting of carboxylic acid salts, oxides, hydroxides and carbonates of the said metals and carbides thereof, capable of being decomposed with water.

5. In the liquid-phase oxidation of aliphatic hydrocarbon materials of high molecular weight and of neutral oxygenated products obtained from an oxidation product of said materials by saponification and removal of the soap solution by blowing the said materials with gases containing as the only oxidizing agent oxygen while heating to from 100° to 200° C., the step which comprises carrying out the reaction in the presence of up to 3 per cent, by weight of said hydrocarbon materials, of a catalytic material consisting essentially of at least one compound each of an alkali metal selected from the group consisting of sodium and potassium and of aluminium, the said compounds being capable of dissolution in the reaction mass and selected from the group consisting of carboxylic acid salts, oxides, hydroxides and carbonates of the said metals and carbides thereof, capable of being decomposed with water.

6. In the liquid-phase oxidation of aliphatic hydrocarbon materials of high molecular weight and of neutral oxygenated products obtained from an oxidation product of said materials by saponification and removal of the soap solution by blowing the said materials with gases containing as the only oxidizing agent oxygen while heating to from 100° to 200° C., the step which comprises carrying out the reaction in the presence of up to 3 per cent by weight of said hydrocarbon materials, of a catalytic material consisting essentially of about 40 per cent of a compound of sodium and about 60 per cent of a compound of aluminium, the said compounds being capable of dissolution in the reaction mass and selected from the group consisting of carboxylic acid salts, oxides, hydroxides and carbonates of the said metals and carbides thereof, capable of being decomposed with water.

WILHELM DIETRICH.
MARTIN LUTHER.